(12) United States Patent
Alexander et al.

(10) Patent No.: US 8,661,491 B1
(45) Date of Patent: Feb. 25, 2014

(54) METHODS USING BASE CONTENT AND ADDITIVE CONTENT AND RELATED CLIENT DEVICES AND NETWORK SERVER DEVICES

(75) Inventors: James Alexander, Denver, CO (US); Michael Adams, Castle Rock, CO (US)

(73) Assignee: Ericsson Television Inc., Duluth, GA (US)

( * ) Notice: Subject to any disclaimer, the term of this patent is extended or adjusted under 35 U.S.C. 154(b) by 0 days.

(21) Appl. No.: 13/564,980

(22) Filed: Aug. 2, 2012

(51) Int. Cl.
*H04N 7/173* (2011.01)

(52) U.S. Cl.
USPC ............... 725/116; 725/93; 725/94; 725/95; 725/96; 725/97

(58) Field of Classification Search
USPC ............................. 725/93–97, 116; 709/231
See application file for complete search history.

(56) References Cited

U.S. PATENT DOCUMENTS

| | | | | |
|---|---|---|---|---|
| 2008/0068446 | A1* | 3/2008 | Barkley et al. | 348/14.07 |
| 2010/0263012 | A1* | 10/2010 | Huang et al. | 725/116 |
| 2012/0076204 | A1* | 3/2012 | Raveendran et al. | 375/240.12 |
| 2012/0275468 | A1* | 11/2012 | Leprovost et al. | 370/442 |

* cited by examiner

*Primary Examiner* — Mulugeta Mengesha

(57) ABSTRACT

Methods of operating a network server device are provided. The methods may include establishing a session with a client device. The methods may also include transmitting a first base segment providing first base content for a first time segment to the client device. The methods may additionally include transmitting a second base segment providing second base content for a second time segment to the client device. The methods may further include transmitting an additive segment including additive content for the second time segment to the client device. Also, the additive content may be synchronized with the second base content. Related methods of operating client devices are also described, as are related network server devices and related client devices.

18 Claims, 12 Drawing Sheets

METHODS USING BASE CONTENT AND ADDITIVE CONTENT AND RELATED CLIENT DEVICES AND NETWORK SERVER DEVICES

TECHNICAL FIELD

The present disclosure is directed to communications and, more particularly, to methods of transmitting/receiving content and related client devices and network server devices.

BACKGROUND

Adaptive streaming of video content may include transmitting a unique video stream to each receiving user, and increasing or decreasing the bit rate of the unique video stream based on available bandwidth. Additionally, video content may be compressed as multiple layers that provide different levels of video quality. For example, the H.264/Scalable Video Coding (SVC) standard provides scalability of a video stream by extraction of portions of an encoded bit stream. As an example, *An Evaluation of TCP-based Rate-Control Algorithms for Adaptive Internet Streaming of H.264/SVC* by Robert Kuschnig et al. (Proceedings Of The First Annual ACM SIGMM Conference On Multimedia Systems, Pages 157-168, 2010) describes that video at a server is stored as a scalable H.264/SVC bit stream. Scalability of the bit stream may allow the extraction of video sequences with different frame rates from the bit stream. Scalability of the bit stream may also allow the extraction of video sequences with different spatial resolutions. Moreover, scalability of the bit stream may allow coarse-grain quality scalable coding or medium-grain quality scalable coding. Current adaptive bit rate streaming solutions, however, transmit larger unique video streams as bandwidth requirements increase, which may be inefficient and burdensome to a network. Thus, there is a need for methods and devices that address this deficiency of current adaptive bit rate streaming solutions.

SUMMARY

Various embodiments of present inventive concepts may provide operations of broadcasting or multicasting base content (e.g., a base layer of video) to a group of receivers in a network and selectively unicasting or multicasting additive content that enhances the base content to a subset of that group. The combination of broadcasting/multicasting base content to a relatively large group and unicasting/multicasting additive content to a smaller subset of that group may improve network efficiency (e.g., reduce network bandwidth burdens) because the network may always have enough bandwidth for the base content and because the network may not be required to repeatedly determine whether to transmit the base content. Moreover, the sender (e.g., a network server) may selectively/adaptively send additive video content to specific receivers when the network has sufficient bandwidth to support the additive video content.

For example, some embodiments of the present invention may provide methods of operating a network server device. The methods may include establishing a session with a client device, and transmitting a first base segment providing first base content for a first time segment to the client device. A second base segment providing second base content for a second time segment may be transmitted to the client device. An additive segment including additive content for the second time segment may be transmitted to the client device. The additive content may be synchronized with the second base content.

In various embodiments, the first base content may include video content for the first time segment, and the second base content and the additive content may include video content for the second time segment.

According to various embodiments, the methods may further include detecting a change in an available bandwidth of a communication path between the network server device and the client device. Also, transmitting the additive segment may include transmitting the additive segment responsive to the available bandwidth exceeding a threshold.

In various embodiments, the methods may further include receiving a notification from the client device. Also, transmitting the additive segment may include transmitting the additive segment responsive to the notification from the client device.

According to various embodiments, a resolution of a combination of the additive content and the second base content may be greater than a resolution of the first base content.

In various embodiments, the additive content may include first additive content. Also, a third base segment providing third base content for a third time segment may be transmitted to the client device. A second additive segment including second additive content for the third time segment may be transmitted to the client device. Additionally, the second additive content may be synchronized with the third base content. Moreover, a resolution of a combination of the second additive content and the third base content may be greater than a resolution of a combination of the first additive content and the second base content.

According to various embodiments, the additive content may include first additive content. Also, the methods may include transmitting a third base segment providing third base content for a third time segment to the client device. The methods may also include transmitting a second additive segment including second additive content for the third time segment to the client device. Additionally, the second additive content may be synchronized with the third base content. Moreover, the methods may further include transmitting a third additive segment including third additive content for the third time segment to the client device. Furthermore, the third additive content may be synchronized with the third base content and the second additive content. Also, a resolution of a combination of the second additive content, the third additive content, and the third base content may be greater than a resolution of a combination of the first additive content and the second base content.

In various embodiments, the first base content and the second base content may define respective first and second consecutive segments of continuous video having equal time duration.

According to various embodiments, the methods may further include, after transmitting the second base segment, transmitting a third base segment providing third base content for a third time segment to the client device. Also, transmitting the additive segment may include transmitting the additive segment after transmitting the third base segment.

In various embodiments, the client device may include a first client device. Also, the methods may include establishing a session with a second client device. Transmitting the first base segment may include transmitting the first base segment providing the first base content for the first time segment to the first and second client devices. Transmitting the second base segment may include transmitting the second base segment providing the second base content for the second time segment to the first and second client devices. Additionally, transmitting the additive segment may include transmitting the additive segment to the first client device without transmitting the additive segment to the second client device.

Methods of operating a client device according to various embodiments may include establishing a session with a network server device. The methods may also include receiving a first base segment providing first base content for a first time segment. The methods may additionally include receiving a second base segment providing second base content for a second time segment. The methods may further include receiving an additive segment including additive content for the second time segment. Also, the additive content may be synchronized with the second base content.

In various embodiments, the first base content may include video content for the first time segment, and the second base content and the additive content may include video content for the second time segment.

According to various embodiments, the methods may further include, before receiving the additive segment, transmitting a notification to the network server device responsive to detecting a change in available bandwidth.

In various embodiments, transmitting the notification may include transmitting the notification responsive to the available bandwidth exceeding a threshold.

According to various embodiments, a resolution of a combination of the additive content and the second base content may be greater than a resolution of the first base content.

In various embodiments, the additive content may include first additive content. Also, the methods may further include receiving a third base segment providing third base content for a third time segment from the network server device. The methods may also include receiving a second additive segment including second additive content for the third time segment from the network server device. Additionally, the second additive content may be synchronized with the third base content. Moreover, a resolution of a combination of the second additive content and the third base content may be greater than a resolution of a combination of the first additive content and the second base content.

According to various embodiments, the additive content may include first additive content. Also, the methods may include receiving a third base segment providing third base content for a third time segment from the network server device. The methods may also include receiving a second additive segment including second additive content for the third time segment from the network server device. The second additive content may be synchronized with the third base content. Moreover, the methods may further include receiving a third additive segment including third additive content for the third time segment from the network server device. The third additive content may be synchronized with the third base content and the second additive content. Also, a resolution of a combination of the second additive content, the third additive content, and the third base content may be greater than a resolution of a combination of the first additive content and the second base content.

In various embodiments, the first base content and the second base content may define respective first and second consecutive segments of continuous video having equal time duration.

According to various embodiments, the methods may further include, after receiving the second base segment, receiving a third base segment providing third base content for a third time segment from the network server device. Also, receiving the additive segment may include receiving the additive segment after receiving the third base segment.

In various embodiments, the methods may further include rendering video on a display of the client device. Also, rendering may include rendering first resolution video output over the first time segment responsive to the first base content and rendering second resolution video output over the second time segment responsive to the second base content and the additive content, where the first resolution is less than the second resolution.

Network server devices according to various embodiments may include a network interface configured to provide a communication interface with a network. The network server devices may also include a processor coupled to the network interface, the processor being configured to establish a session with a client device, transmit a first base segment providing first base content for a first time segment to the client device, transmit a second base segment providing second base content for a second time segment to the client device, and transmit an additive segment including additive content for the second time segment to the client device. Also, the additive content may be synchronized with the second base content.

In various embodiments of network server devices, the first base content may include video content for the first time segment. Also, the second base content and the additive content may include video content for the second time segment.

According to various embodiments of network server devices, the processor may be configured to detect a change in an available bandwidth of a communication path between a network server device and the client device. Also, transmitting the additive segment may include transmitting the additive segment responsive to the available bandwidth exceeding a threshold.

In various embodiments of network server devices, the processor may be configured to receive a notification from the client device. Also, transmitting the additive segment may include transmitting the additive segment responsive to the notification from the client device.

Client devices according to various embodiments may include a network interface configured to provide a communication interface with a network. The client devices may also include a processor coupled to the network interface, the processor being configured to establish a session with a network server device, receive a first base segment providing first base content for a first time segment, receive a second base segment providing second base content for a second time segment, and receive an additive segment including additive content for the second time segment. Also, the additive content may be synchronized with the second base content.

In various embodiments of client devices, the first base content may include video content for the first time segment, and the second base content and the additive content may include video content for the second time segment.

According to various embodiments of client devices, the processor may be configured to, before receiving the additive segment, transmit a notification to the network server device responsive to detecting a change in available bandwidth.

In various embodiments of client devices, transmitting the notification may include transmitting the notification responsive to the available bandwidth exceeding a threshold.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the disclosure. In the drawings.

DETAILED DESCRIPTION

Figure 1A:
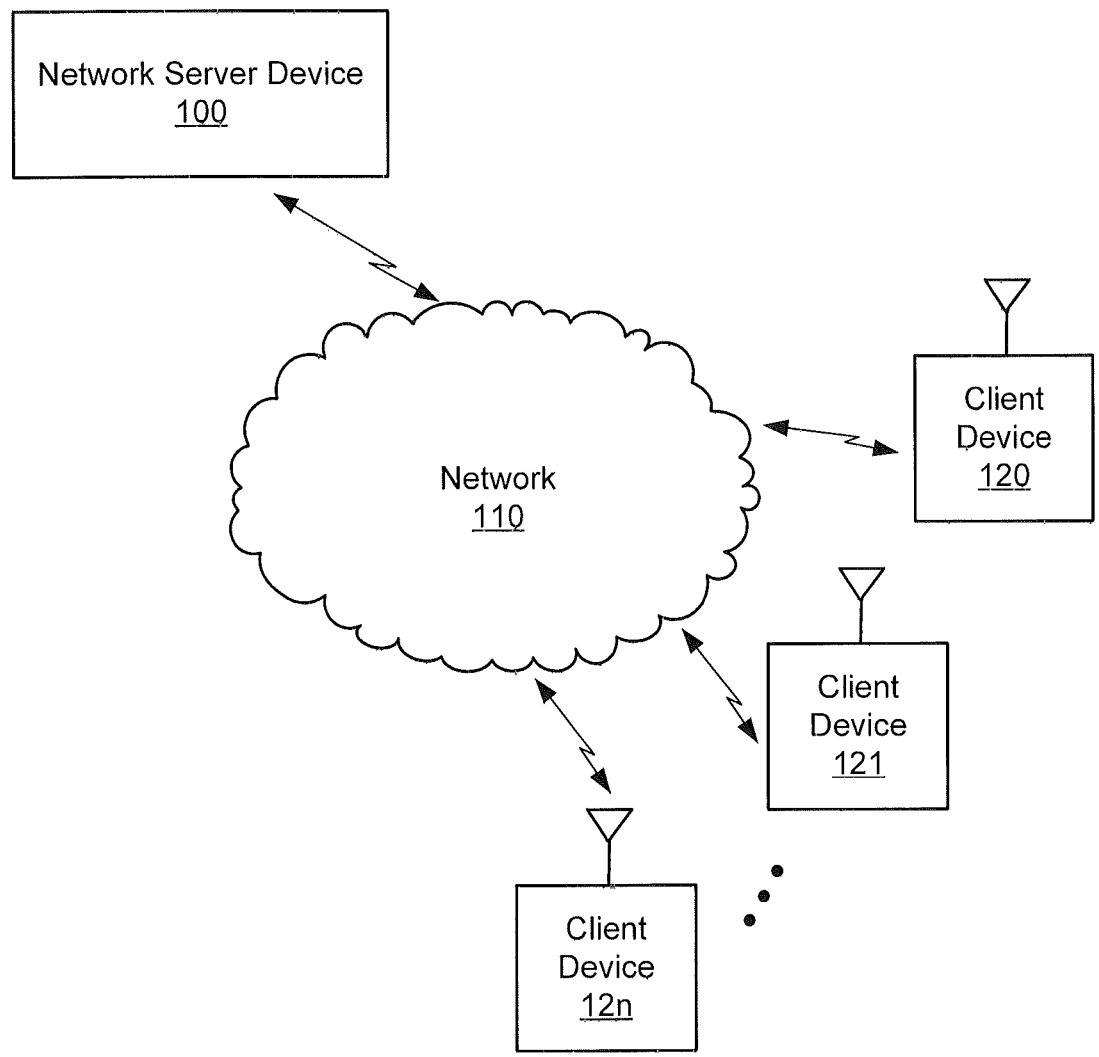
FIG. 1A is a schematic illustration of a network that provides communications between a network server device and client devices, according to various embodiments.

The present invention will now be described more fully hereinafter with reference to the accompanying drawings, in which examples of embodiments of the invention are shown. The invention may, however, be embodied in many different forms and should not be construed as limited to the embodiments set forth herein. Rather, these embodiments are provided so that this disclosure will be thorough and complete, and will fully convey the scope of the present invention to those skilled in the art. It should also be noted that these embodiments are not mutually exclusive. Components from one embodiment may be tacitly assumed to be present/used in another embodiment.

In the description of various embodiments, it is to be understood that the terminology used herein is for the purpose of describing particular embodiments only and is not intended to be limiting of the inventive concepts. Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

It will be understood that, although the terms "first," "second," etc. may be used herein to describe various elements, these elements should not be limited by these terms. These terms are only used to distinguish one element from another. Thus, a "first" element could be termed a "second" element without departing from the teachings of the present embodiments.

When an element is referred to as being "connected," "coupled," "responsive," or variants thereof to another element, it can be directly connected, coupled, or responsive to the other element or intervening elements may be present. In contrast, when an element is referred to as being "directly connected," "directly coupled," "directly responsive," or variants thereof to another element, there are no intervening elements present. Like numbers refer to like elements throughout. Furthermore, "coupled," "connected," "responsive," or variants thereof as used herein may include wirelessly coupled, connected, or responsive. As used herein, the singular forms "a," "an," and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise," "comprising," "comprises," "include," "including," "includes," "have," "has," "having," or variants thereof are open-ended, and include one or more stated features, elements, steps, components or functions but do not preclude the presence or addition of one or more other features, elements, steps, components, functions or groups thereof. Furthermore, as used herein, the common abbreviation "e.g.," which derives from the Latin phrase "exempli gratia," may be used to introduce or specify a general example or examples of a previously mentioned item, and is not intended to be limiting of such item. The common abbreviation "i.e.," which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the disclosure may be embodied in hardware and/or in software (including firmware, resident software, micro-code, etc.) that runs on a processor such as a digital signal processor, which may collectively be referred to as "circuitry," "a module," or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the inventive concepts. Moreover, although some of the diagrams include arrows on communication paths to show a primary direction of communication, it is to be understood that communication may occur in the opposite direction to the depicted arrows.

For purposes of illustration and explanation only, various embodiments are described herein in the context of "client devices." Among other devices/systems, client devices may include wireless communication terminals (e.g., portable electronic devices/wireless terminals/mobile terminals/terminals) that are configured to carry out cellular and/or Wireless Local Area Network (WLAN) (e.g., 802.11) communications. It will be understood, however, that present inventive concepts are not limited to such embodiments and may be embodied generally in any device and/or system that is configured to receive/render video content. For example, the client devices may also include televisions (and/or receivers/boxes/media players connected thereto), desktop computers, and portable computers.

Adaptive streaming technologies may use a unicast model in which a unique video stream is transmitted to each receiving user. In other words, the unicast model involves a one-to-one relationship between a sender and a receiver for all transmissions. In contrast, a broadcast model includes transmitting data to a relatively large reception group (e.g., an entire network), and a multicast model includes transmitting data to a certain physical/logical/virtual region (e.g., a group of receivers or a node; i.e., a subset of the relatively large reception group) within the network but not to the entire network. Unicast models thus may use network resources (e.g., bandwidth/capacity) inefficiently. Various embodiments of present inventive concepts, however, may provide operations of broadcasting or multicasting base content (e.g., a base layer of video) to a group of receivers in a network and selectively unicasting or multicasting additive content that enhances the base content to a subset of that group.

The combination of broadcasting/multicasting base content to a relatively large group and unicasting/multicasting additive content to a smaller subset of that group may improve network efficiency (e.g., reduce network bandwidth burdens) because the network may always have enough bandwidth for the base content and because the network may not be required to repeatedly determine whether to transmit the base content. Moreover, the sender (e.g., a network server) may selectively/adaptively send additive video content to specific receivers when the network has sufficient bandwidth to support the additive video content. Accordingly, the base content may represent a lowest bit rate possible and may be delivered at all times (e.g., for all time segments), whereas the additive content may only be delivered when sufficient bandwidth/capacity is available on a receiver-by-receiver basis.

Referring now to FIG. 1A, a schematic illustration is provided of a network 110 that provides communications between a network server device 100 and client devices 120, 121, . . . 12n, according to various embodiments. In particular, the network server device 100 may transmit content (e.g., video content) over the network 110 to the client devices 120, 121, . . . 12n. Also, the client devices 120, 121, . . . 12n may transmit requests for content and feedback regarding received content over the network 110 to the network server device 100. Moreover, the network 110 may be wireless (e.g., cellular or WLAN) and/or wired (e.g., cable or fiber optic). The client devices 120, 121, . . . 12n, may, for example, be wireless terminals communicating with the network server device 100 over wireless and wired network elements.

Figure 1B:
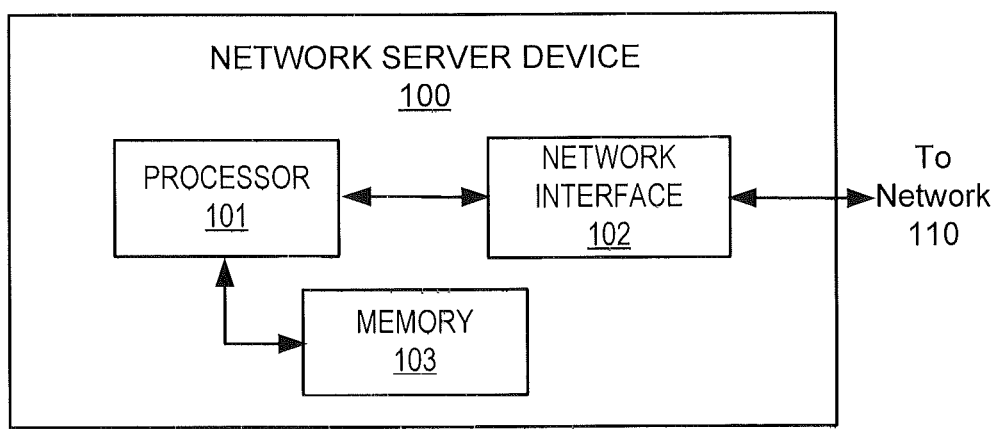
FIG. 1B is a block diagram of the network server device of FIG. 1A, according to various embodiments.

Referring now to FIG. 1B, a block diagram is provided of the network server device 100 of FIG. 1A, according to various embodiments. In particular, FIG. 1B illustrates that the network server device 100 may include a network interface 102 that is configured to provide a communication interface with the network 110. The network server device 100 may further include a processor 101 that is coupled to the network interface 102. The processor 101 may be configured to establish a session with a client device 120 through the network interface 102 and the network 110 and to transmit (e.g., control transmission of) base segments including base content and additive segments including additive content to the client device 120 through the network interface 102 and the network 110. The network server device 100 may also include a memory 103 that is coupled to the processor 101. The memory 103 may store the base content, the additive content, and/or instructions/algorithms used to transmit the base content and/or the additive content to the client devices 120, 121, . . . 12n. Moreover, it will be understood that the network server device 100 may include a single server or a combination of servers that transmit content to the client devices 120, 121, . . . 12n. For example, the base content and/or the additive content may be distributed/stored among different servers.

Figure 1C:
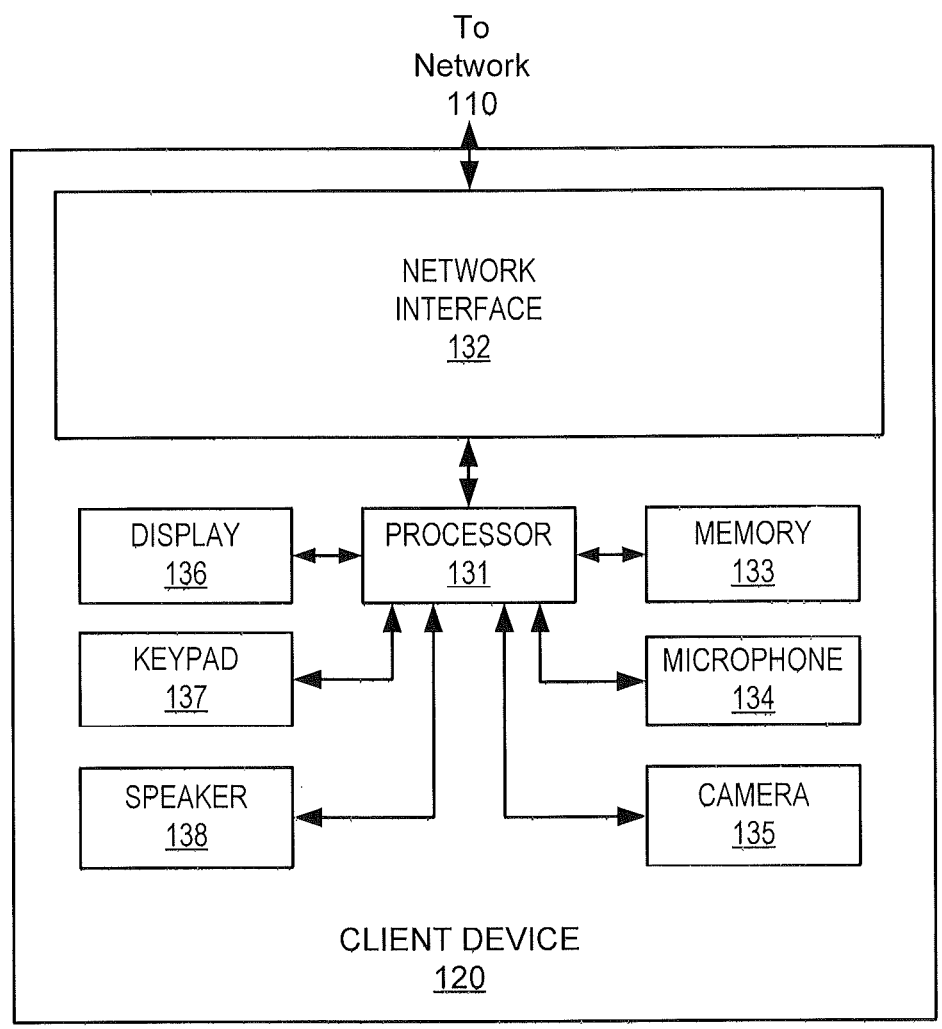
FIG. 1C is a block diagram of one of the client devices of FIG. 1A, according to various embodiments.

Referring now to FIG. 1C, a block diagram is provided for one of the client devices 120, 121, . . . 12n of FIG. 1A, according to various embodiments. In particular, FIG. 1C illustrates that the client device 120 may include a network interface 132 that is configured to provide a communication interface with the network 110. The network interface 132 may include one or more antennas for wireless communications and/or may include ports (e.g., cable, fiber optic ports) for wired communications. The client device 120 may further include a processor 131 that is coupled to the network interface 132. The processor 131 may be configured to establish a session with the network server device 100 (through the network interface 132 and the network 110) and to receive base segments including base content and additive segments including additive content from the network server device 100 (through the network interface 132 and the network 110).

As is further illustrated in FIG. 1C, the client device 120 may also include a display 136, keypad 137, speaker 138, memory 133, microphone 134, and/or camera 135. It will be understood, however, that some embodiments (e.g., television embodiments) of the client device 120 may omit components such as the keypad 137, microphone 134, and/or camera 135. The memory 133 can store computer program instructions that, when executed by the processor 131, carry out the operations (e.g., rendering video content, transmitting feedback to the network server device 100) described herein and shown in the figures. As an example, the memory 133 can be non-volatile memory, such as a flash memory, that retains the stored data while power is removed from the memory 133.

Figure 2A:
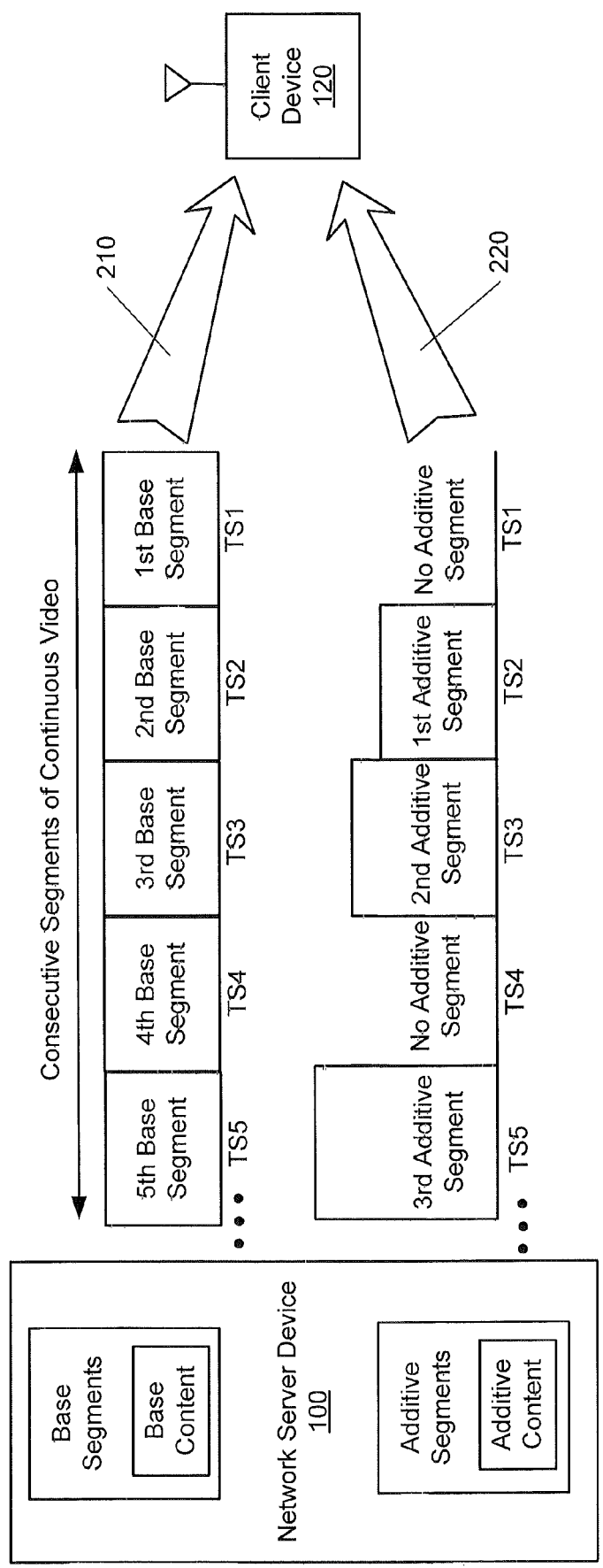
FIGS. 2A-2D are schematic illustrations of transmissions of base segments and additive segments from the network server device of FIG. 1A to one or more of the client devices of FIG. 1A, according to various embodiments.
Figure 2B:
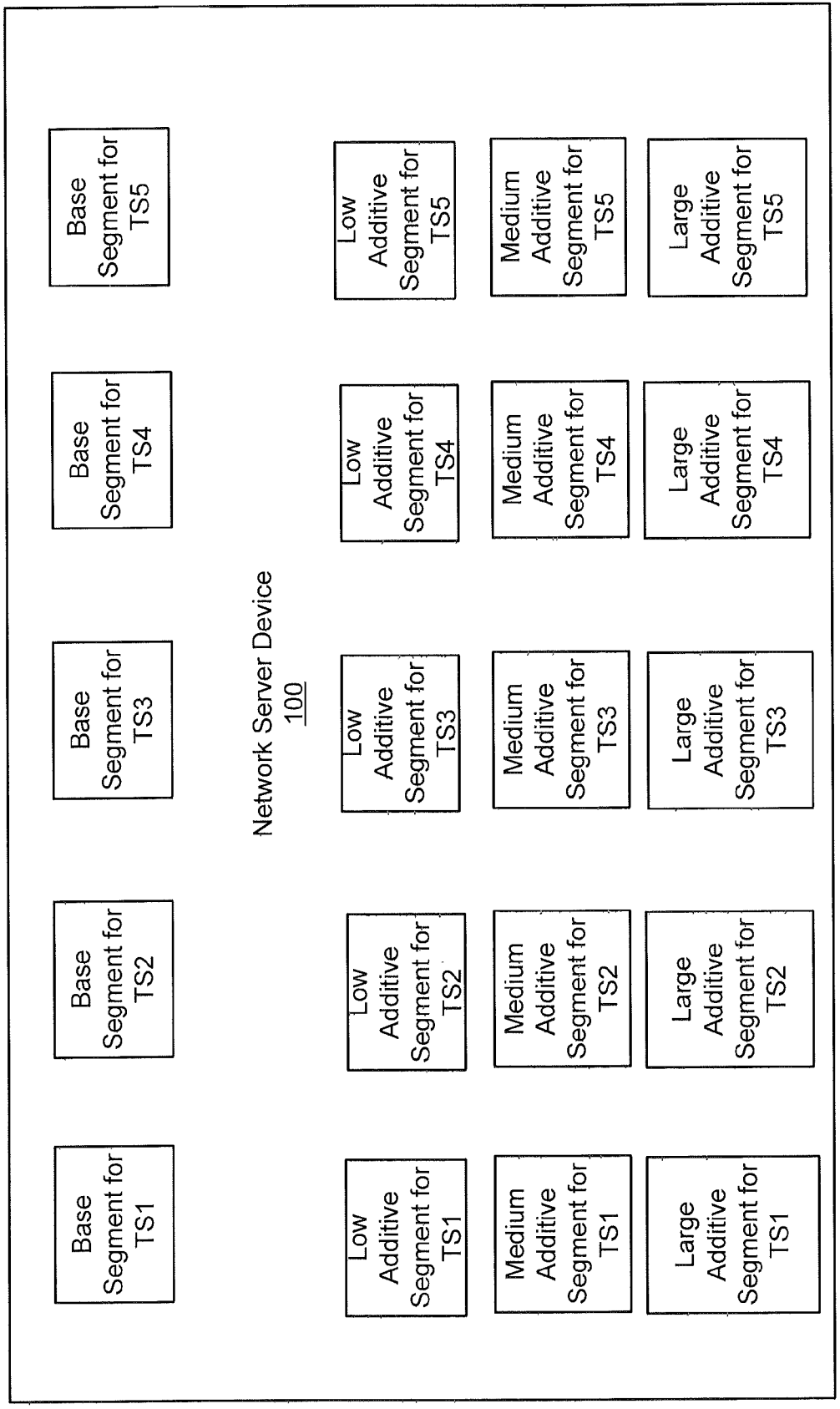

Referring now to FIGS. 2A-2D, schematic illustrations are provided of transmissions of base segments and additive segments from the network server device 100 of FIG. 1A to one or more of the client devices 120, 121, . . . 12n of FIG. 1A, according to various embodiments. FIGS. 2A and 2B illustrate that the network server device 100 may store base segments including base content and additive segments including additive content. In particular, FIG. 2B illustrates individual ones of the base segments and additive segments that are illustrated in FIG. 2A. The base segments and additive segments stored in the network server device 100 may include segments of a digital file (e.g., a multimedia file including video content) that correspond to specific time segments/periods. Each of the file segments may be an independent file. For example, for the first time segment TS1 (e.g., the first ten (10) seconds of a video clip of a movie or television show), a base segment and an additive segment (or a plurality of additive segments, as illustrated in FIG. 2B) may be stored in the network server device 100. In other words, the base segment corresponding to the first time segment TS1 provides base content that can be rendered/played by the client device 120, and the additive segment (or plurality of additive segments) corresponding to first time segment TS1 provides additive content that enhances that base content (e.g., that provides increased frame rate and/or resolution).

The time segments TS1-TS5 may be consecutive time segments. Also, each of the time segments TS1-TS5 may have equal time duration (e.g., one (1) second or ten (10) seconds). Accordingly, the first time segment TS1 may correspond to the first ten (10) seconds of a video clip, the second time segment may correspond to the next ten (10) seconds of the video clip, and so on. The first through fifth base segments illustrated in FIG. 2A thus indicate consecutive segments of continuous video content. Additionally, it will be understood that the five (5) time segments TS1-TS5 are described herein to provide an example of time segments and corresponding base segments and additive segments. In other words, a movie, television show, or other video content transmitted by the network server device 100 may include hundreds or thousands (or more) of time segments.

The additive segments illustrated in the network server device 100 of FIGS. 2A and 2B may include additive segments and additive content corresponding to each of the time segments TS1-TS5. Although the network server device 100 may store additive segments for each of the time segments TS1-TS5, a particular client device (e.g., the client device 120), however, may only receive additive segments from the network server device 100 during some of the time segments TS1-TS5. In particular, the network server device 100 may store various versions (e.g., sizes/quality levels) of additive content corresponding to the first time segment TS1 and the fourth time segment TS4 illustrated in FIG. 2A, and yet the network server device 100 may withhold (i.e., not transmit) additive segments to the client device 120 during the first time segment TS1 and the fourth time segment TS4. In contrast, FIG. 2A illustrates that the network server device 100 transmits additive segments including additive content that enhances the base content corresponding to the second time segment TS2, the third time segment TS3, and the fifth time segment TS5.

Specifically, FIG. 2B illustrates that the network server device 100 stores a base segment and a plurality of additive segments (e.g., low, medium, and large/high enhancement additive segments) for each of the time segments TS1-TS5. Although the base segments are sufficient for the client device 120 to render/play video content, the client device 120 may receive one of the additive segments (e.g., one of the low, medium, or large/high enhancement additive segments), in addition to a base segment, to provide enhanced video content for a particular time segment. For example, the first additive segment transmitted in FIG. 2A may be the low additive segment for the second time segment TS2 illustrated in FIG. 2B. Also, the second additive segment transmitted in FIG. 2A may be the medium additive segment for the third time segment TS3 illustrated in FIG. 2B. Furthermore, the third additive segment transmitted in FIG. 2A may be the large/high additive segment for the fifth time segment TS5 illustrated in FIG. 2B. Accordingly, the client device 120 may combine the first, second, and third additive segments illustrated in FIG. 2A with the second, third, and fifth base segments, respectively, to render/play video content for the second, third, and fifth time segments TS2, TS3, and TS5, respectively. In contrast, the client device 120 may render/play video content for the first and fourth time segments TS1 and TS4 using only the base segment for the first time segment TS1 and the base segment for the fourth time segment TS4, respectively. It will be understood, however, that, in some embodiments, the client device 120 may be able to receive at least one additive segment for every time segment (e.g., for each of the time segments TS1-TS5, or an entire television show or movie), and may thus be able to render/play enhanced video content for all time segments (e.g., for each of the time segments TS1-TS5, or an entire television show or movie).

The additive segments may vary in data size/quality. For example, the additive segment corresponding to the fifth time segment TS5 in FIG. 2A (e.g., the large additive segment for the fifth time segment TS5 in FIG. 2B) may include large/high quality additive content in comparison with the additive segment corresponding to the third time segment TS3 (e.g., FIG. 2B's medium size/quality additive content for the third time segment TS3) or the additive segment corresponding to the second time segment TS2 (e.g., FIG. 2B's low size/quality additive content for the time segment TS2). In other words, the additive content of the additive segment corresponding to the fifth time segment TS5 in FIG. 2A (e.g., the large additive segment for the fifth time segment TS5 in FIG. 2B) may provide the greatest level of enhancement to the base content. In some embodiments, the additive segments may have equal sizes and/or may be layered with each other to provide different levels of content enhancement.

Referring still to FIG. 2A, the base segments may be transmitted from the network server device 100 to the client device 120 in a base segment stream 210, which may be encoded at a minimum/lowest bit rate. The base segment stream 210 may be broadcast/multicast to all of the client devices 120, 121, . . . 12n of the reception group at all times (e.g., for all time segments), and thus shared by all of the client devices 120, 121, . . . 12n of the reception group, thereby reducing bandwidth burdens of the network 110 and/or the network server device 100. The additive segments may be selectively transmitted from the network server device 100 to the client device 120 in an additive segment stream 220, which may be encoded at a bit rate higher than the minimum/lowest bit rate (e.g., to provide an increased resolution, frame rate, etc.). Accordingly, the additive segment stream 220 may include additive segments of varying size/quality. Moreover, in contrast with the base segment stream 210, the additive segment stream 220 may be selectively multicast or unicast to the client device 120 only when the bandwidth for doing so is available.

As an alternative to the single additive segment stream 220, the network server device 100 may transmit the additive segments to the client device 120 via a plurality of additive segment streams (e.g., a low size/quality additive segment stream, a medium size/quality additive segment stream, and a high size/quality additive segment stream). The plurality of additive segment streams may be different versions of a digital file encoded at different bit rates.

The client device 120 may be configured to combine the base segment stream 210 and the additive segment stream 220 (or a plurality of additive segment streams) and to render continuous video using the combined streams. As an example, the network server device 100 may deliver the base segment stream 210 and the additive segment stream 220 to the client device 120 (e.g., a wireless terminal) simultaneously or nearly simultaneously (e.g., with a delay of no more than a few seconds). In particular, the client device 120 may begin receiving base segments and/or additive segments for a movie, and may begin rendering video upon receipt of a first base segment (or first group of base segments). Upon receipt of a first additive segment (or first group of additive segments), which may be simultaneous or nearly simultaneous with receipt of the first base segment (or first group of base segments), the client device 120 may combine the additive segment stream 220 with the base segment stream 210 to provide enhanced (e.g., low, medium, or large/high enhancement) quality video content.

As another example, the network server device 100 may deliver the base segment stream 210 to a Digital Video Recorder (DVR). In particular the DVR (which may be coupled to a television to provide the client device 120) may download base segments for an entire movie (or portion of a movie), and then may receive the additive segment stream 220 in real time (e.g., while playing back the base segment stream 210), and may combine the base segment stream 210 and the additive segment stream 220 to provide enhanced (e.g., low, medium, or large/high enhancement) quality video content.

Accordingly, the client device 120 may be configured to receive multiple encoded streams and to reassemble the encoded streams. Moreover, although the base segment stream 210 and the additive segment stream 220 may include segments of multimedia content (e.g., a movie) that has been recorded in its entirety, the base segment stream 210 and/or the additive segment stream 220 may also include segments of multimedia content for live/ongoing events such as sporting events or musical concerts.

Figure 2C:
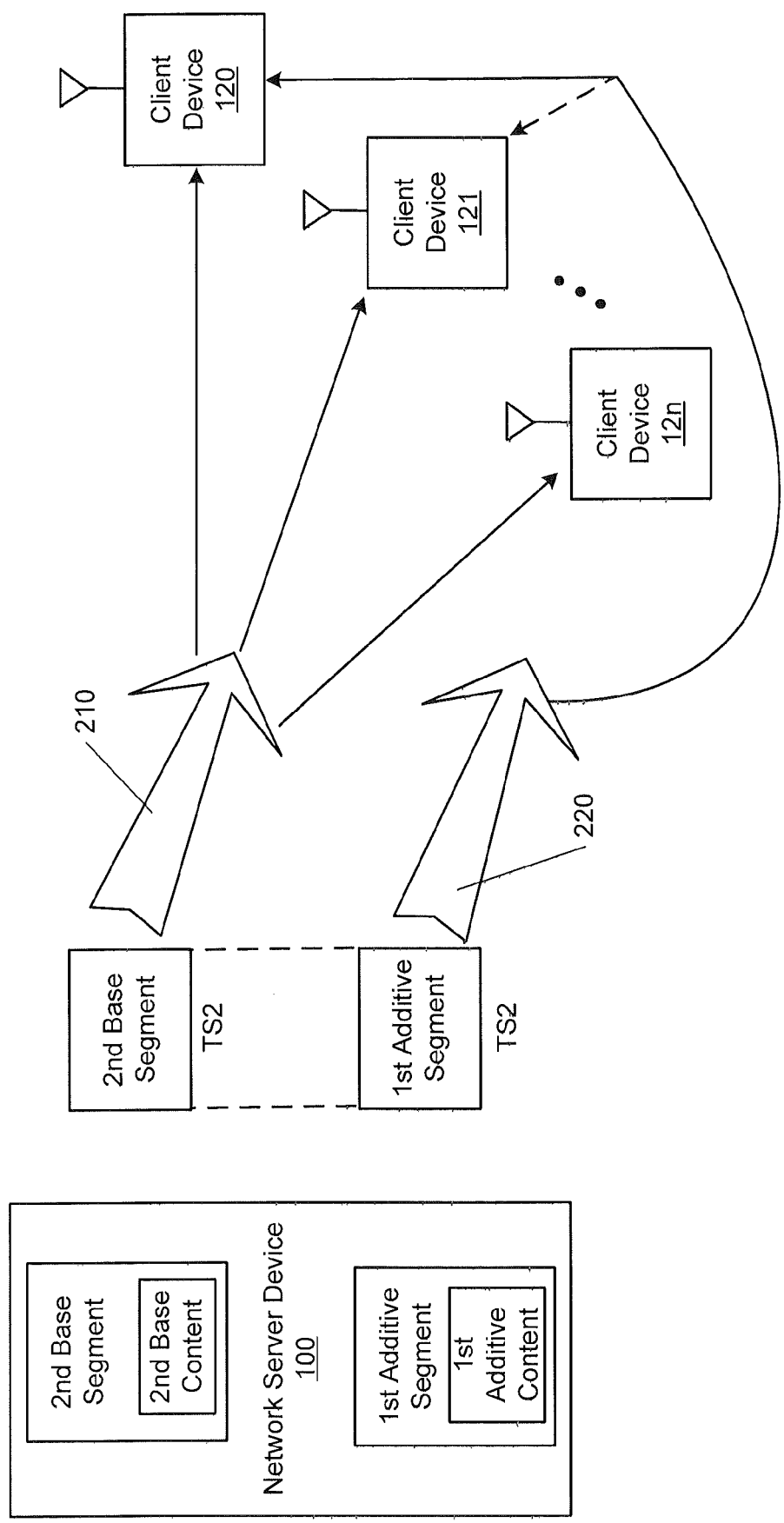

Referring now to FIG. 2C, the second time segment TS2 of FIG. 2A is illustrated. In particular, FIG. 2C illustrates that the base segment corresponding to the second time segment TS2 (e.g., FIG. 2A's second base segment, which is the base segment for the time segment TS2 illustrated in FIG. 2B) is broadcast/multicast from the network server device 100 to all of the client devices 120, 121, . . . 12n of the reception group via the base segment stream 210. In contrast, the additive segment corresponding to the second time segment TS2 (e.g., FIG. 2A's first additive segment, which is the low additive segment for time segment TS2 illustrated in FIG. 2B) is either multicast to the client devices 120 and 121 (e.g., a subset of the reception group) or unicast to the client device 120 via the additive segment stream 220.

FIG. 2C also illustrates that the content of the base segment and the content of the additive segment corresponding to the second time segment TS2 are synchronized with respect to (e.g., each segment corresponds to the same portions of) the second time segment TS2. In particular, the additive content included in the additive segment corresponding to the second time segment TS2 is synchronized with the base content included in the base segment corresponding to the second time segment TS2 so that the corresponding base and additive segments can be combined to render the respective segment of the content being transmitted. As such, playback (i.e., rendering) of a combination of the additive content and the base content corresponding to the second time segment TS2 may be seamless (i.e., without delay with respect to playback of the additive content and playback of the base content) and smooth. For example, if the second time segment TS2 is defined by seconds eleven (11) through twenty (20) of a video, then the additive content synchronized with base content for the second time segment TS2 includes additive content for seconds eleven (11) through twenty (20) of the video, and the base content for the second time segment TS2 includes base content for seconds eleven (11) through twenty (20) of the video. Synchronized content, however, does not require synchronization of transmissions of base and additive segments including synchronized content.

Moreover, the client device 120 may match/combine the received base content and additive content that are synchronized with respect to the second time segment TS2. Accordingly, transmission of the additive segment stream 220 may be either delayed (e.g., before or after) or simultaneous with respect to transmission of the base segment stream 210, irrespective of the synchronization and matching/combination of the base content and the additive content. Additionally or alternatively to delaying transmission of the additive segment stream 220 with respect to transmission of the base segment stream 210, the additive segment stream 220 and the base segment stream 210 may be transmitted via different paths of a network or even using different networks. For example, the base segment stream 210 may be transmitted to the client device 120 via a cellular (e.g., Long Term Evolution (LTE)) network, whereas the additive segment stream 220 may be transmitted to the client device 120 via the Internet/WLAN. Additionally, cable/satellite/fiber optic networks may be used to transmit one or more of the additive segment stream 220 and the base segment stream 210 to the client device 120.

Also, the quality level (e.g., resolution, frame rate, etc.) of a combination of the additive content corresponding to the second time segment TS2 and the base content corresponding to the second time segment TS2 is greater than the quality level of the base content corresponding to the first time segment TS1 illustrated in FIG. 2A. Additionally, FIG. 2A illustrates that the additive segment corresponding to the third time segment TS3 (e.g., the medium additive segment for the third time segment TS3 illustrated in FIG. 2B) is larger than the additive segment corresponding to the second time segment TS2 (e.g., the low additive segment for the second time segment TS2 illustrated in FIG. 2B). Accordingly, the quality level (e.g., medium enhancement) of a combination of the additive content corresponding to the third time segment TS3 and the base content corresponding to the third time segment TS3 is greater than the quality level (e.g., low enhancement) of a combination of the additive content corresponding to the second time segment TS2 and the base content corresponding to the second time segment TS2

Figure 2D:
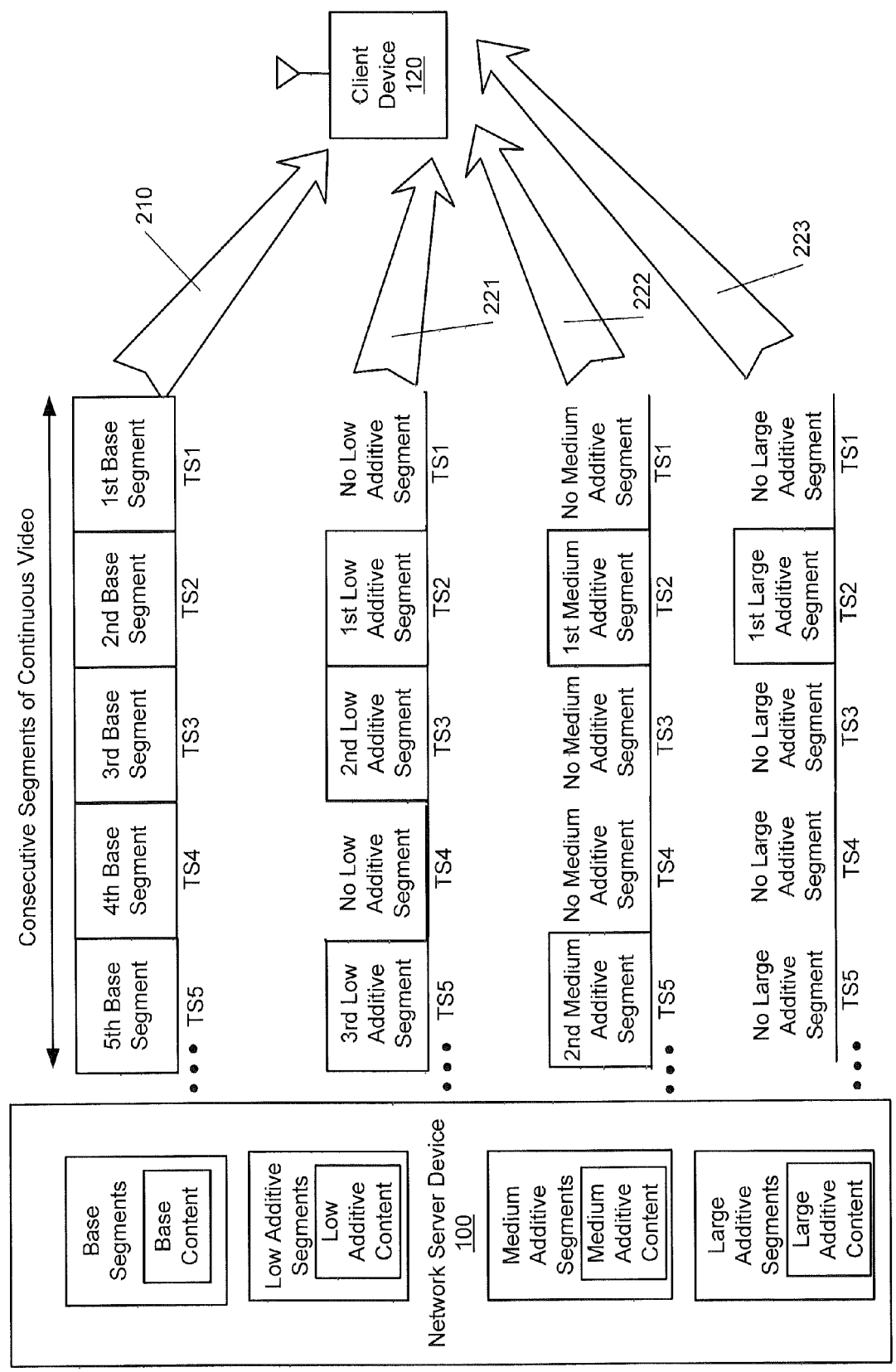

Referring now to FIG. 2D, the network server device 100 may store different sizes/quality levels of additive content for the same time segment. For example, FIGS. 2A and 2B illustrate that for each of the time segments TS1-TS5, the network server device 100 may store low, medium, and large/high additive segments including additive content having low, medium, and large/high sizes/quality levels, respectively. Moreover, although FIG. 2A illustrates the single additive segment stream 220 including additive content of different sizes/quality levels, FIG. 2D illustrates a plurality of additive segment streams 221-223. In particular, FIG. 2D illustrates a low additive segment stream 221 including low additive segments having low additive content, a medium additive segment stream 222 including medium additive segments having medium additive content, and a large/high additive segment stream 223 including large/high additive segments having large/high additive content. Specifically, FIG. 2B illustrates individual ones of the base segments and additive segments that are illustrated in FIG. 2D. The additive segment streams 221-223 may be transmitted individually from the network server device 100 to the client device 120. The additive content of the additive segment streams 221-223 may then be matched/combined/layered at the client device 120 to enhance the base content from the base segment stream 210. In various embodiments, the base stream 210 and/or one or more of the additive streams 220, 221, 222, 223 may be H.264/SVC bit streams.

Referring still to FIG. 2D, additive segments of the additive segment streams 221-223 may be either selectively/adaptively multicast or unicast to the client device 120 by the network server device 100. Accordingly, it may be that none of the additive segments corresponding to the first time segment TS1 is transmitted to the client device 120. Moreover, it may be that the low additive segment (but not the medium or large/high segments) corresponding to the third time segment TS3 is transmitted to the client device 120, and that the low and medium additive segments (but not the large/high additive segment) corresponding to the fifth time segment TS5 are transmitted to the client device 120. Also, it will be understood that as the low, medium, and large/high additive content may be layered on each other, the large/high additive content does not necessarily have a larger data size than the low additive content. Rather, the large/high additive content may have the same data size, or even a smaller data size than the low additive content corresponding to a given time segment. The combination of the large/high additive content with the medium and low additive content and base content, however, has a larger data size (and a higher quality) than the combination of either the low additive content or the medium additive content and base content.

Figure 3A:
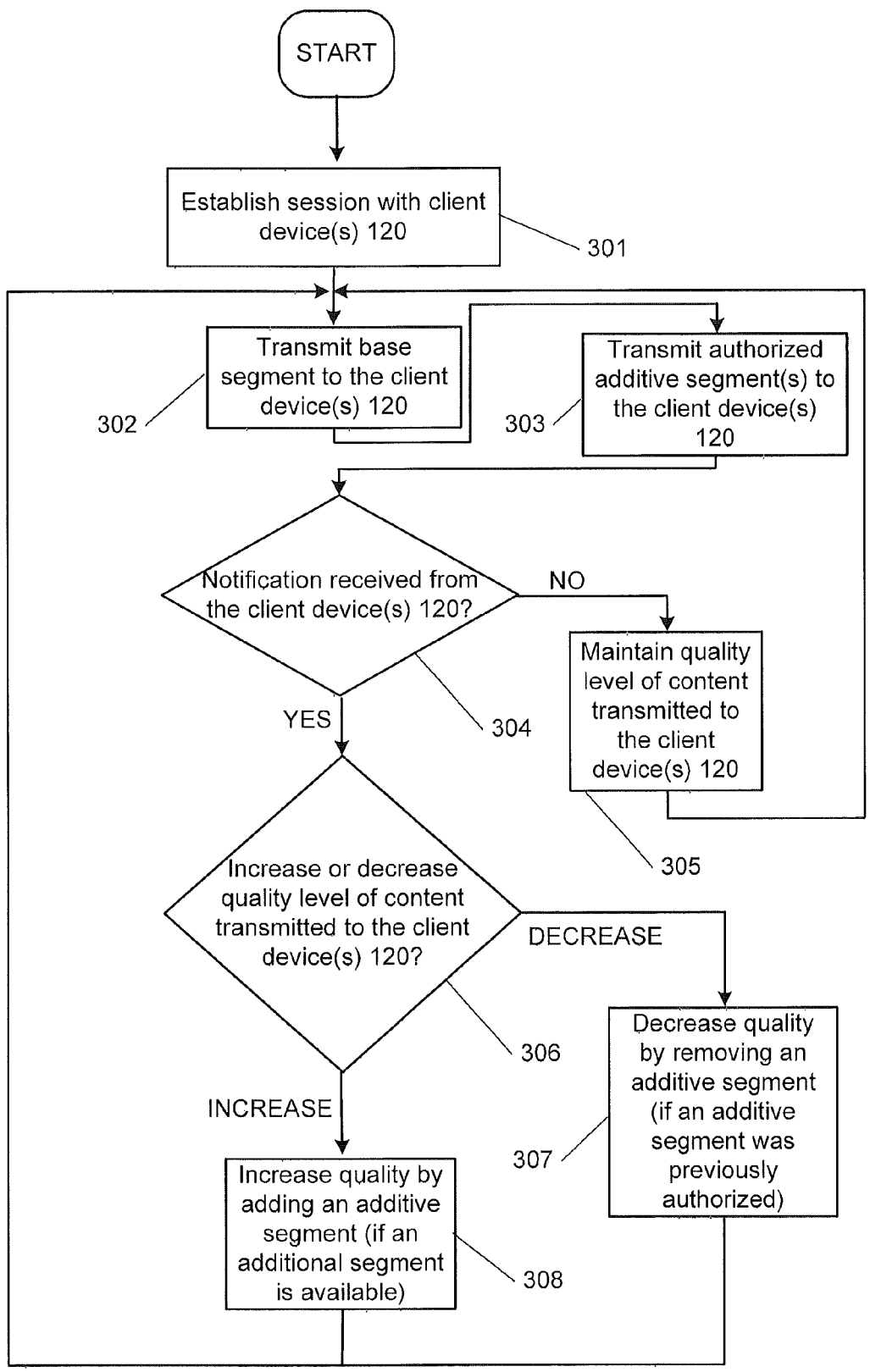
FIGS. 3A-3C are flowcharts illustrating operations of the network server device of FIG. 1A, according to various embodiments.
Figure 3B:
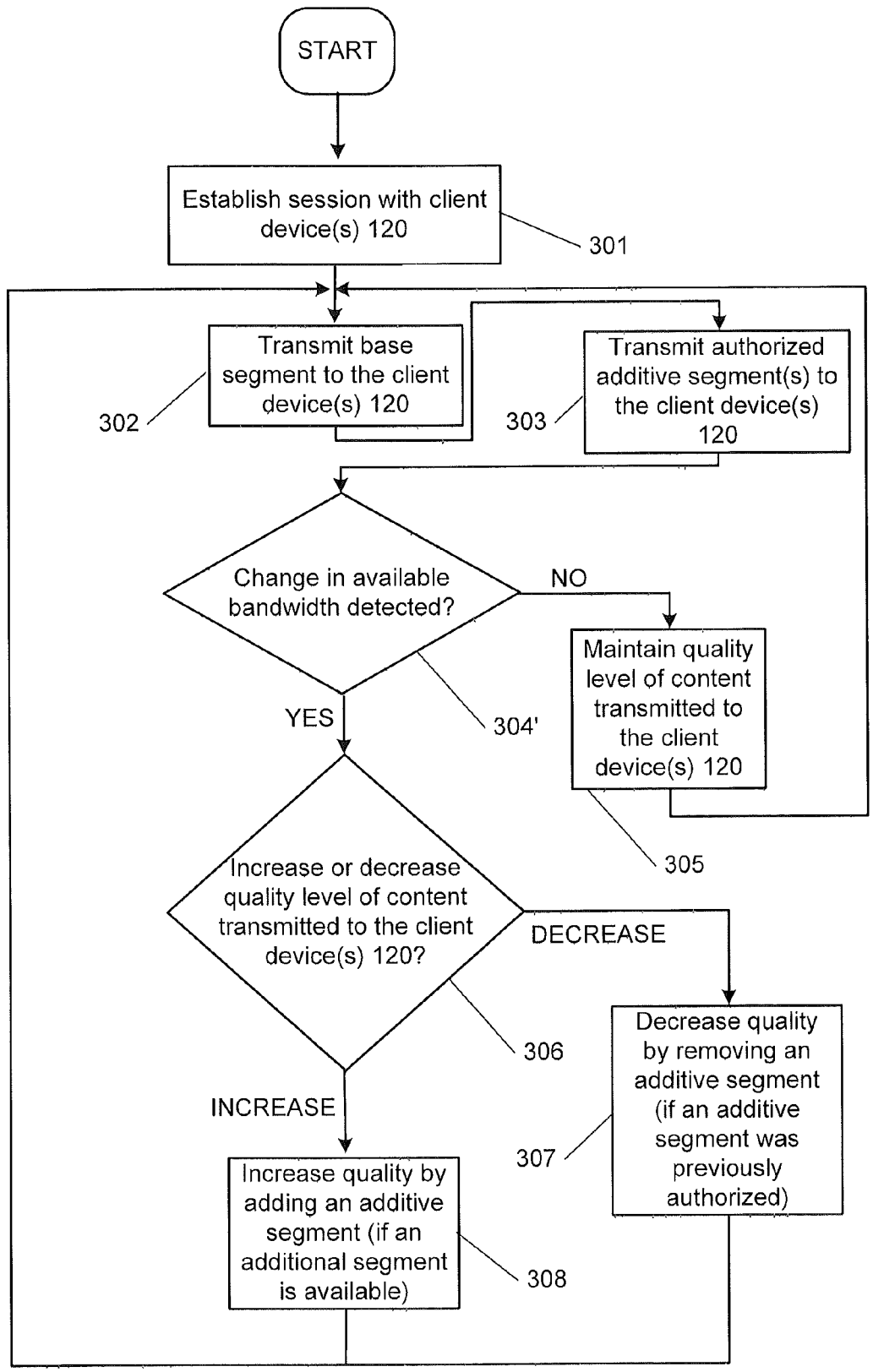
Figure 3C:
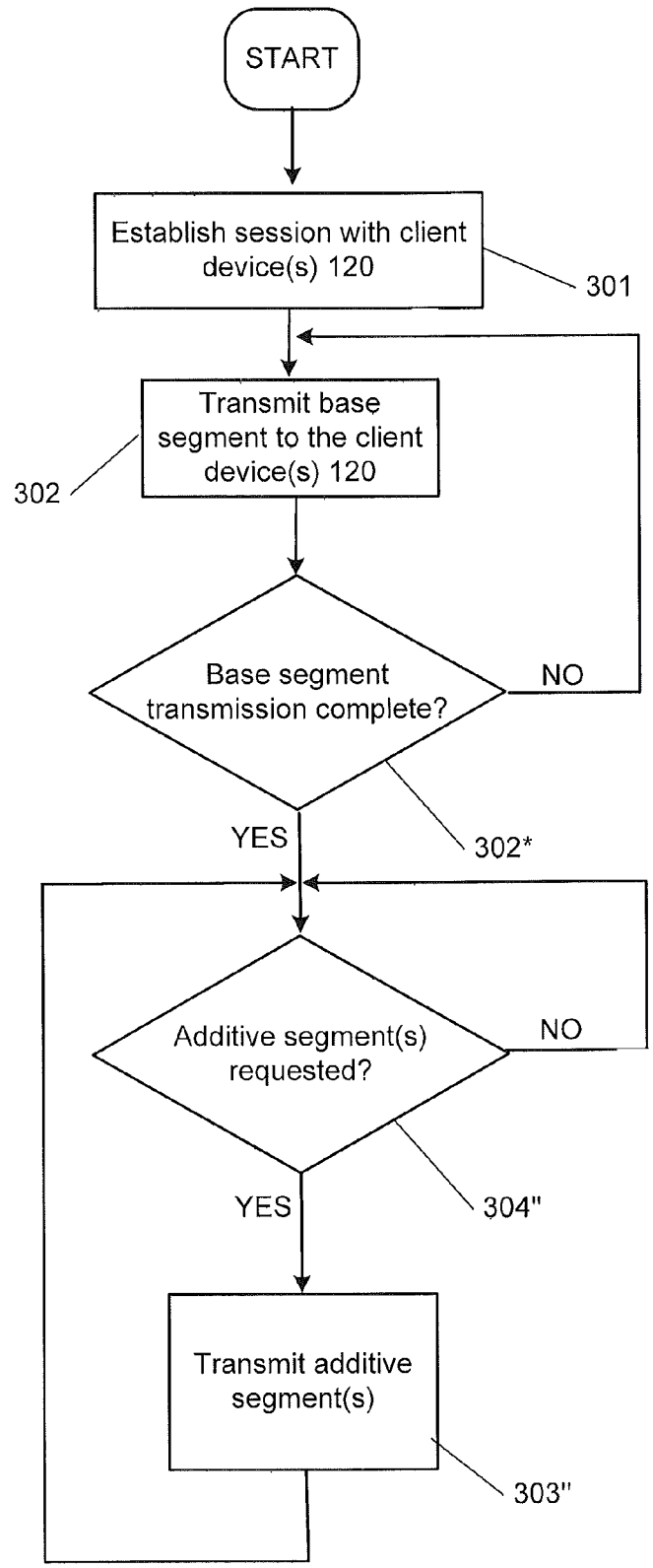

Referring now to FIGS. 3A-3C, flowcharts are provided illustrating operations of the network server device 100 of FIG. 1A, according to various embodiments. Referring to FIG. 3A, operations of the network server device 100 may include the processor 101 establishing (Block 301) a session with the client device 120 through the network interface 102. The processor 101 may transmit (Block 302) a base segment (e.g., a first base segment) providing base content (e.g., first base content) for (e.g., corresponding to) a first time segment TS1 through the network interface 102 to the client device 120. Moreover, as the base segments described herein may be transmitted to a larger reception group of the client devices 120, 121, . . . 12n (whereas the additive segments may be selectively transmitted to a subset of the larger reception group), it will be understood that transmitting (Block 302) the base segment may include broadcasting the base segment from the network server device 100 to each of the client devices 120, 121, . . . 12n. Additionally, the base segment (and possibly subsequent base segments) may be simultaneously transmitted to each of the client devices 120, 121, . . . 12n. Alternatively, the transmission of the base segment to the client device 121 may be delayed (e.g., by five (5) seconds or one (1) minute) with respect to the transmission of the base segment to the client device 120.

Referring still to FIG. 3A, operations of the network server device 100 may include transmitting (Block 303) one or more authorized additive segments to one or more of the client devices 120, 121, . . . 12n. Moreover, as the additive segment(s) may be selectively transmitted (e.g., unicast) to the client device 120, transmitting (Block 303) the additive segment(s) may include transmitting the additive segment(s) to the client device 120 without transmitting the additive segment(s) to the client device 121. For example, the client device 120 may have authorized (e.g., via a user selection or an automated decision based on network conditions or device capabilities) one or more additive segments. As an example, a user of the client device 120 may have requested receipt of a movie at a large/high quality level (e.g., high definition (HD)), and transmitting the movie to the client device 120 at the large/high quality level may include transmitting multiple layers of additive segments corresponding to a given time segment (e.g., the first time segment TS1). Accordingly, the movie may begin with the base content enhanced by the additive content. Moreover, Blocks 302 and 303 may be combined into one block, or the order/flow of Blocks 302 and 303 may be reversed.

After transmitting (Blocks 302, 303) the base segment and the additive segment(s) (if authorized) to one or more of the client devices 120, 121, . . . 12n, the processor 101 may determine (Block 304) whether a notification (e.g., a notification to maintain, increase, or decrease the quality/bandwidth of a stream/content) has been received from one or more of the client devices 120, 121, . . . 12n. If a notification has not been received, then the network server device 100 may maintain (Block 305) the quality level of content transmitted to one or more of the client devices 120, 121, . . . 12n. For example, the network server device 100 may transmit (Block 302) another base segment (e.g., a second base segment) providing addition base content (e.g., a second base content) for a second time segment TS2 to the client devices 120, 121, . . . 12n. Additionally, if previously authorized, the network server device 100 may continue transmitting (Block 303) one or more additive segments to one or more of the client devices 120, 121, . . . 12n. For example, the network server device 100 may transmit (Block 303) another additive segment (e.g., a second additive segment) or other additive segments (e.g., second layers of additive segments) to the client device 120.

Alternatively, if a notification has been received from one or more of the client devices 120, 121, . . . 12n, then the network server device 100 may determine (Block 306) whether to increase or decrease the quality level of content transmitted to one or more of the client devices 120, 121, . . . 12n. For example, the network server device 100 may make the determination (Block 306) using the notification (e.g., an express indication to increase or decrease quality, or an indication of network conditions such as available bandwidth). If the network server device 100 decides (Block 306) to decrease the quality level, then the network server device 100 will decrease (Block 307) the quality level by removing an additive segment (if an additive segment was previously authorized). For example, if a low quality additive segment was authorized for the first time segment TS1, then the low quality additive segment will be removed from the second time segment TS2. Alternatively, if no additive segment was authorized for the first time segment TS1, then no additive segment will be removed from the second time segment TS2 because no additive segment can be removed.

On the other hand, if the network server device 100 decides (Block 306) to increase the quality level, then the network server device 100 will increase (Block 308) the quality level by adding an additive segment (if an additional additive segment is available). For example, if a low quality additive segment was authorized for the first time segment TS1, then a medium quality additive segment (and possibly a large/high quality additive segment) will be added for the second time segment TS2. Alternatively, if a largest/highest additive segment was authorized for the first time segment TS1, then no larger/higher additive segment will be added for the second time segment TS2 because the largest/highest additive segment is already present.

Referring still to FIG. 3A, after either decreasing (Block 307) or increasing (Block 308) quality, the network server device 100 will transmit (Blocks 302, 303) a base segment and additive segment(s) (if available). For example, the network server device 100 may transmit (Block 302) a base segment for the second time segment TS2 and may transmit (Block 303) an additive segment (if available) for the second time segment TS2 responsive to the notification from the client device 120. Additionally, the additive content for the second time segment TS2 is synchronized with the base content (e.g., second base content) for the second time segment TS2. In particular, the additive content for the second time segment TS2 and the base content for the second time segment TS2 are for the same time segment (i.e., the second time segment TS2) of video content. As an example, the additive content for the second time segment TS2 and the base content for the second time segment TS2 may be for the same scene or segment of a scene (e.g., group of frames) of a movie. Accordingly, the additive content for the second time segment TS2 enhances the quality of the base content for the second time segment TS2.

Referring now to FIG. 3B, FIG. 3B includes Blocks 301, 302, 303, 305, 306, 307, and 308 of FIG. 3A. Moreover, FIG. 3B includes Block 304', which is a modification of Block 304 of FIG. 3A. In particular, FIG. 3B illustrates monitoring an available bandwidth by detecting (Block 304') a change (e.g., an increase or a decrease) in an available bandwidth of a communication path between the network server device 100 and the client device 120. The available bandwidth may be defined as the capability of the client device 120 to receive (and/or of the network server device 100 to transmit) a higher quality stream, or the capability to continue receiving/transmitting an enhanced quality stream. In one example, the network server device 100, rather than the client device 120, may detect (Block 304') the change in the available bandwidth, and may decrease (Block 307) or increase (Block 308) content quality responsive to the detected change. As an example, the network server device 100 may determine that certain areas of the network 110 (e.g., areas including the client devices 120, 121) are not receiving additive segments, and may therefore decide to discontinue transmissions of additive segments to those areas of the network 110. It will be understood, however, that the client device 120 or other devices (e.g., other devices coupled to the network 110 and/or the network server device 100) may additionally or alternatively detect (Block 304') the change. Moreover, transmitting (Block 303) authorized additive segment(s) in FIG. 3B may be responsive to the available bandwidth (or a change thereof) exceeding a threshold.

Referring now to FIG. 3C, FIG. 3C includes Blocks 301 and 302 of FIG. 3A. Moreover, FIG. 3C includes Block 302*, Block 304", which is a modification of Block 304 of FIG. 3A, and Block 303", which is a modification of Block 303 of FIG. 3A. In particular, FIG. 3C illustrates completing base segment transmission (Block 302*) before transmitting (Block 303") one or more additive segments from the network server device 100. It will be understood that completing base segment transmission (Block 302*) may include completing base segment transmission for an entire video (e.g., an entire movie, television show, or other video clip) or for a scene or other subset of the video. Additionally, FIG. 3C illustrates transmitting (Block 303") one or more additive segments responsive to a request (e.g., from the client device 120) for one or more additive segments (Block 304").

For example, the network server device 100 may transmit first, second, and third base segments to the client devices 120, 120, ... 12n in Block 302 of FIG. 3C. Accordingly, transmitting (303") the additive segment(s) in FIG. 3C may include transmitting (303") the additive segment(s) after transmitting (Block 302) the third base segment.

Figure 4A:
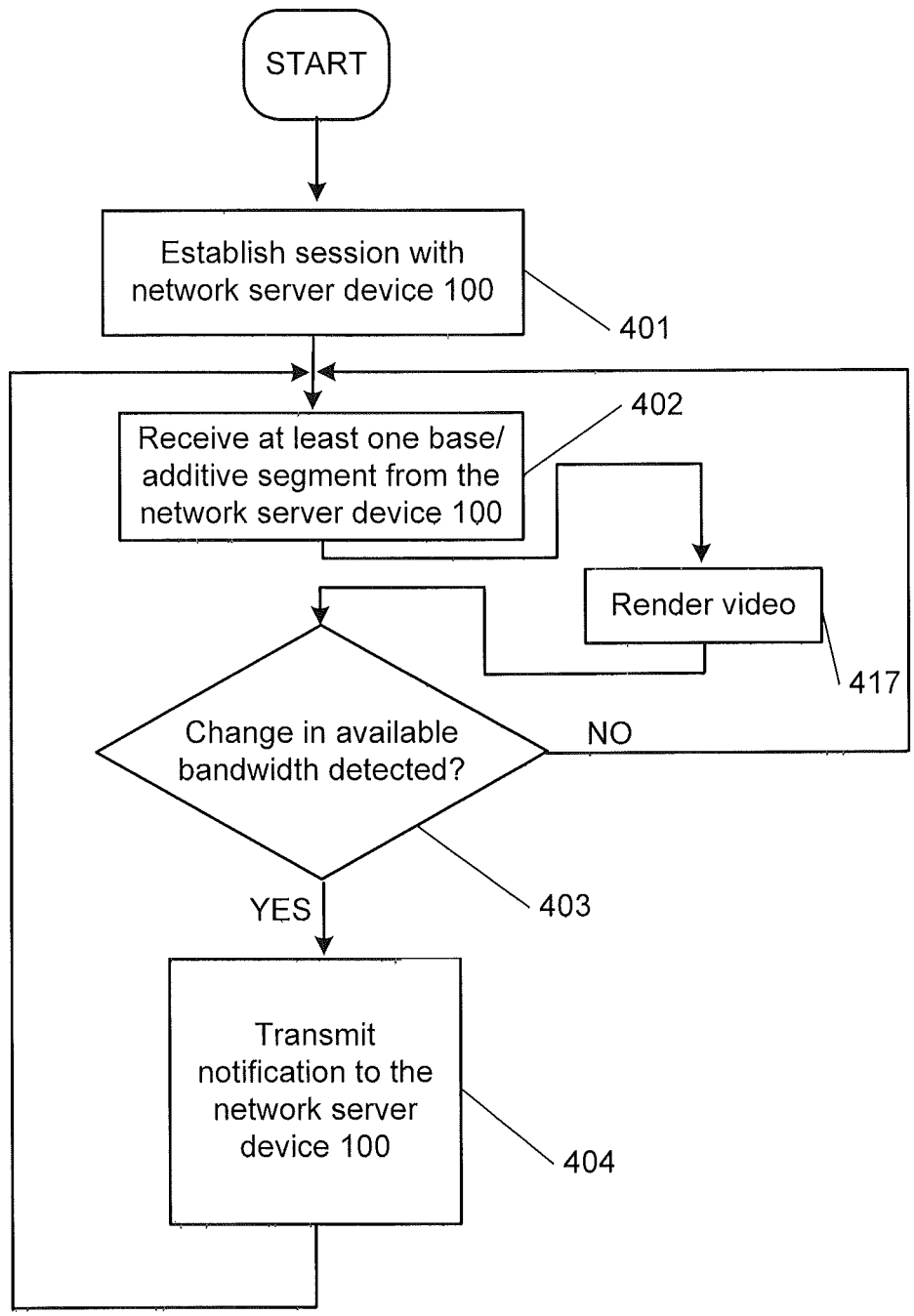
FIGS. 4A and 4B are flowcharts illustrating operations of one of the client devices of FIG. 1A, according to various embodiments.
Figure 4B:
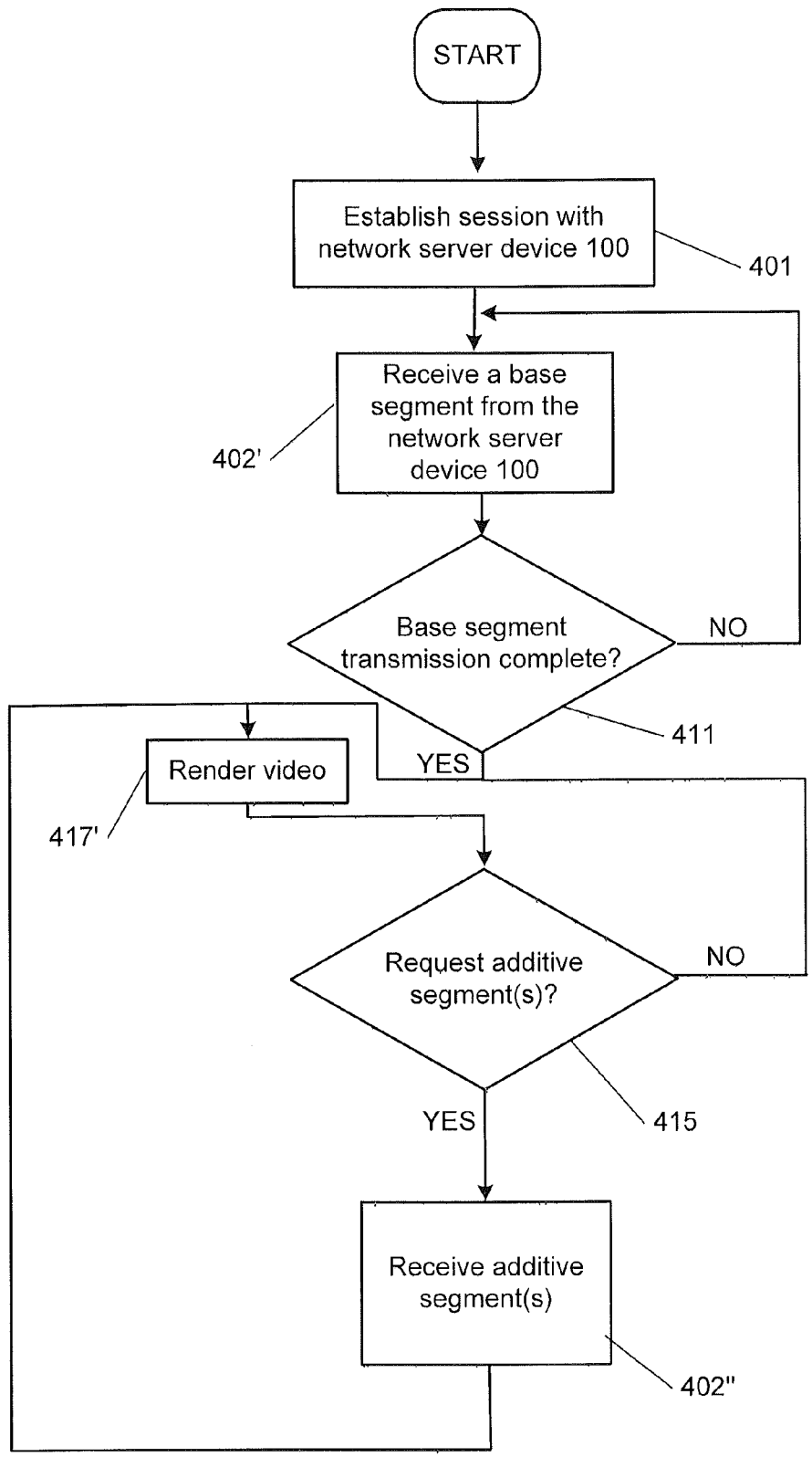

Referring now to FIGS. 4A and 4B, flowcharts are provided illustrating operations of one of the client devices 120, 121, ... 12n of FIG. 1A, according to various embodiments. For example, FIG. 4A illustrates operations of the client device 120, which may include the processor 131 establishing (Block 401) a session with the network server device 100. The processor 131 may receive (Block 402) a base segment providing base content for a first time segment TS1. The processor 131 may receive (Block 402) another base segment providing base content for a second time segment TS2. Additionally, the processor 131 may receive (Block 402) an additive segment including additive content for the first time segment TS1 and/or an additive segment including additive content for the second time segment TS2. Moreover, as described herein, the additive content for a particular time segment is synchronized with the base content for that time segment. For example, the client device 120 may match/combine additive content for the second time segment TS2 that is synchronized with base content for the second time segment TS2 to provide seamless and smooth playback of a combination of the additive content and the base content.

As described herein, the base content and additive content may include video content. Accordingly, after the processor 131 receives (Block 402) at least one base/additive segment from the network server device 100, the client device 120 (e.g., using the processor 131) may render (Block 417) video on a display (e.g., the display 136 illustrated in FIG. 1C) of the client device 120. Rendering (Block 417) video may include rendering the base/lowest quality (e.g., resolution, frame rate) video output over a given time period (e.g., the first time segment TS1) if only base content is received at the client device 120 for that time segment. Moreover, rendering (Block 417) video may further include rendering higher (e.g., enhanced) quality video output over another time period (e.g., the second time segment TS2) responsive to receiving a combination of base content and additive content.

Referring still to FIG. 4A, operations of the client device 120 may further include the processor 131 detecting (Block 403) a change in available bandwidth for a communication path between the client device 120 and the network server device 100. For example, the client device 120 (e.g., using the processor 131) may determine whether it can use a faster bit rate, or whether it should receive a lower bit rate. If no change is detected, then the client device 120 may continue receiving (Block 402) base/additive segments from the network server device 100 at a previously-determined quality level. If a change is detected, however, then the client device 120 (e.g., using the processor 131) may transmit (Block 404) a notification to the network server device 100. The notification may generally indicate that a change has been detected, or the notification may more specifically indicate a level of available bandwidth or may more specifically indicate an increase or decrease (e.g., an increase or decrease in available bandwidth, or a request to increase or decrease the resolution or data rate of content). Moreover, the notification may indicate that the client device 120 has requested a unicast transmission or has joined a multicast group. After transmitting (Block 404) the notification to the network server device 100, the client device 120 may receive (Block 402) video segments including either increased or decreased quality video content.

According to some embodiments, no additive segments are received by the client device 120 before transmitting (Block 404) the notification to the network server device 100. In other words, before receiving any additive segment, the client device 120 may first transmit (Block 404) the notification to the network server device 100 responsive to detecting a change in available bandwidth. Moreover, it will be understood that transmitting (Block 404) the notification may include transmitting the notification responsive to the available bandwidth (or a change thereof) exceeding a threshold. Alternatively, at least one additive segment may be received by the client device 120 before transmitting (Block 404) the notification to the network server device 100. For example, the client device 120 may have previously authorized (e.g., via a user selection or an automated decision based on network conditions or device capabilities) one or more additive segments before receiving any base or additive segments in Block 402.

An example of differences in device capabilities is that it may be inefficient/wasteful for a small-screen device (e.g., a portable electronic device with a small display screen) to receive high resolution video that it cannot fully display, whereas a big-screen HD television may be capable of more fully displaying the high resolution video. Also, even though the portable electronic device and the HD television may be owned by the same user and may even be located in the same room of a building, it may be more efficient for these devices with different capabilities to receive different levels of content enhancement. Accordingly, network efficiency may be increased if the client device 120 indicates its device capabilities to the network server device 100, either before or after receiving a first additive segment.

Additionally, although the client device 120 may request additive segments by transmitting (Block 404) the notification to the network server device 100, it may be that the client device 120 never requests base segments. In other words, the client device 120 may receive (Block 402) at least one base segment responsive to the client device 120 joining a broadcast or a multicast. As the client device 120 may only request additive segments (and not request base segments, aside from joining a broadcast or multicast), network resources (e.g., bandwidth) may be preserved, thus increasing network efficiency.

Referring now to FIG. 4B, operations of the client device 120 are illustrated in which the client device 120 renders (Block 417') video before receiving (Block 402") any additive segments from the network server device 100. In other words, the client device 120 renders (Block 417') video for a first time period (e.g., the first time segment TS1 and/or the second time segment TS2) using only a base segment (or base segments).

In particular, FIG. 4B illustrates operations of the client device 120 that include establishing (Block 401) a session with the network server device 100 and receiving (Block 402') a base segment providing base content. The operations of the client device 120 may further include determining (Block 411) whether base segment transmission is complete. If base segment transmission is not complete, then the client device 120 continues to receive base segments from the network server device 100. If base segment transmission is complete, however, then the client device 120 renders (Block 417') video using the received base segment(s).

After (or during) rendering (Block 417') video using the received base segment(s), the client device 120 determines (Block 415) whether to request one or more additive segments. For example, the client device 120 may make the determination (Block 415) based on network conditions (e.g., available bandwidth) or device capabilities (e.g., resolution capabilities of the display 136). If no additive segments are to be requested, then the client device continues to receive (Block 402') base segments from the network server device 100 and to render (Block 417') video using the received base segments. On the other hand, if one or more additive segments are to be requested, then the client device 120 requests and receives (Block 402") the additive segment(s) from the network server device 100, and then renders (Block 417') video using a combination of one or more received base segments and one or more received additive segments.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present disclosure. All such variations and modifications are intended to be included herein within the scope of the present disclosure. Accordingly, the above disclosed subject matter is to be considered illustrative, and not restrictive, and the appended claims are intended to cover all such modifications, enhancements, and other embodiments, which fall within the spirit and scope of the present disclosure.

What is claimed is:

1. A method of operating a network server device, the method comprising:
    establishing a session with a client device;
    transmitting a first base segment providing first base content for a first time segment to the client device;
    transmitting a second base segment providing second base content for a second time segment to the client device;
    transmitting an additive segment including additive content for the second time segment to the client device, wherein
        the additive content is synchronized with the second base content, and
        a resolution of a combination of the additive content and the second base content is greater than a resolution of the first base content;
    transmitting a third base segment providing third base content for a third time segment to the client device; and
    transmitting a second additive segment including second additive content for the third time segment to the client device wherein the second additive content is synchronized with the third base content, wherein
        a resolution of a combination of the second additive content and the third base content is greater than a resolution of a combination of the first additive content and the second base content.

2. The method of claim 1 wherein the first base content comprises video content for the first time segment, and wherein the second base content and the additive content comprise video content for the second time segment.

3. The method of claim 1 further comprising:
    detecting a change in an available bandwidth of a communication path between the network server device and the client device;

wherein transmitting the additive segment comprises transmitting the additive segment responsive to the available bandwidth exceeding a threshold.

4. The method of claim 1 further comprising:
receiving a notification from the client device;
wherein transmitting the additive segment comprises transmitting the additive segment responsive to the notification from the client device.

5. The method of claim 1 wherein the additive content comprises first additive content, the method further comprising:
transmitting a third base segment providing third base content for a third time segment to the client device; and
transmitting a second additive segment including second additive content for the third time segment to the client device wherein the second additive content is synchronized with the third base content; and
transmitting a third additive segment including third additive content for the third time segment to the client device wherein the third additive content is synchronized with the third base content and the second additive content, wherein a resolution of a combination of the second additive content, the third additive content, and the third base content is greater than a resolution of a combination of the first additive content and the second base content.

6. The method of claim 1 wherein the first base content and the second base content define respective first and second consecutive segments of continuous video having equal time duration.

7. The method of claim 1 further comprising:
after transmitting the second base segment, transmitting a third base segment providing third base content for a third time segment to the client device;
wherein transmitting the additive segment comprises transmitting the additive segment after transmitting the third base segment.

8. The method of claim 1, wherein the client device comprises a first client device, further comprising:
establishing a session with a second client device;
wherein transmitting the first base segment comprises transmitting the first base segment providing the first base content for the first time segment to the first and second client devices;
wherein transmitting the second base segment comprises transmitting the second base segment providing the second base content for the second time segment to the first and second client devices;
wherein transmitting the additive segment comprises transmitting the additive segment to the first client device without transmitting the additive segment to the second client device.

9. A method of operating a client device, the method comprising:
establishing a session with a network server device;
receiving a first base segment providing first base content for a first time segment;
receiving a second base segment providing second base content for a second time segment;
receiving an additive segment including additive content for the second time segment wherein the additive content is synchronized with the second base content, wherein
a resolution of a combination of the additive content and the second base content is greater than a resolution of the first base content, and
the additive content comprises first additive content; and receiving a third base segment providing third base content for a third time segment from the network server device; and receiving a second additive segment including second additive content for the third time segment from the network server device wherein the second additive content is synchronized with the third base content, wherein a resolution of a combination of the second additive content and the third base content is greater than a resolution of a combination of the first additive content and the second base content.

10. The method of claim 9 wherein the first base content comprises video content for the first time segment, and wherein the second base content and the additive content comprise video content for the second time segment.

11. The method of claim 9 further comprising:
before receiving the additive segment, transmitting a notification to the network server device responsive to detecting a change in available bandwidth.

12. The method of claim 11 wherein transmitting the notification comprises transmitting the notification responsive to the available bandwidth exceeding a threshold.

13. The method of claim 9 wherein the additive content comprises first additive content, the method further comprising:
receiving a third base segment providing third base content for a third time segment from the network server device; and
receiving a second additive segment including second additive content for the third time segment from the network server device wherein the second additive content is synchronized with the third base content; and
receiving a third additive segment including third additive content for the third time segment from the network server device wherein the third additive content is synchronized with the third base content and the second additive content, wherein a resolution of a combination of the second additive content, the third additive content, and the third base content is greater than a resolution of a combination of the first additive content and the second base content.

14. The method of claim 9 wherein the first base content and the second base content define respective first and second consecutive segments of continuous video having equal time duration.

15. The method of claim 9 further comprising:
after receiving the second base segment, receiving a third base segment providing third base content for a third time segment from the network server device;
wherein receiving the additive segment comprises receiving the additive segment after receiving the third base segment.

16. The method of claim 9 further comprising:
rendering video on a display of the client device, wherein rendering comprises rendering first resolution video output over the first time segment responsive to the first base content and rendering second resolution video output over the second time segment responsive to the second base content and the additive content, wherein the first resolution is less than the second resolution.

17. A network server device comprising:
a network interface configured to provide a communication interface with a network;
a processor coupled to the network interface; and
a non-transitory computer-readable storage medium, coupled to the processor, further including computer-readable instructions, when executed by the processor, are configured to:
  establish a session with a client device,
  transmit a first base segment providing first base content or a first time segment to the client device,
  transmit a second base station providing second base content for a second time segment to the client device,
  transmit an additive segment including additive content for the second time segment to the client device, wherein the additive content is synchronized with the second base content, and a resolution of a combination of the additive content and the second base content is greater than a resolution of the first base content,
  transmit a third base segment providing third base content for a third time segment to the client device, and
  transmit a second additive segment including second additive content for the third time segment to the client device, wherein the second additive content is synchronized with the third base content, wherein a resolution of a combination of the second additive content and the third base content is greater than a resolution of a combination of the first additive content and the second base content.

18. A client device comprising:
a network interface configured to provide a communication interface with a network;
a processor coupled to the network interface;
a non-transitory computer readable storage medium, coupled to the processor, further including computer-readable instructions, when executed by the processor, are configured to:
  establish a session with a network server device,
  receive a first base segment providing first base content for a first time segment,
  receive a second base segment providing second base content for a second time segment,
  receive an additive segment including additive content for the second time segment wherein the additive content is synchronized with the second base content, wherein a resolution of a combination of the additive content and the second base content is greater than a resolution of the first base content, and the additive content comprises first additive content,
  receive a third base segment providing third base content for a third time segment from the network server device, and
  receive a second additive segment including second additive content for the third time segment from the network server device wherein the second additive content is synchronized with the third base content, wherein a resolution of a combination of the second additive content and the third base content is greater than a resolution of the combination of the first additive content and the second base content.

* * * * *